Patented Aug. 14, 1945

2,382,860

UNITED STATES PATENT OFFICE 2,382,860

LUBRICATING COMPOSITION

James F. Cook, Albany, Calif., assignor to Union Oil Company of California, Los Angeles, Calif., a corporation of California No Drawing. Application January 20, 1943, Serial No. 472,985

6 Claims. (Cl. 252—28)

This application relates to lubricants suitable for unusual uses in which they may be subjected to contact with solvents which dissolve ordinary lubricants.

In lubricating equipment used for the handling of certain chemicals and oils, it has been found that ordinary lubricating oils and greases are often inadequate. For example, where a solvent such as methyl ethyl ketone is being handled in pumps it is frequently found that the grease normally used in the pump packing glands is dissolved by the solvent to some degree, thus contaminating the solvent stream, reducing the effectiveness of the packing, and failing to provide adequate lubrication.

It has been found that an excellent lubricant relatively insoluble in such powerful solvents as ketones, gasoline, naphtha, benzene, toluene, sulfur dioxide, furfural, phenol, propane, etc., may be prepared by combining glycerine and ground mica in various proportions, including a small amount of starch also if desired to stabilize the mixture.

For example, a lubricant prepared from 75 parts of dynamite grade glycerine, 20 parts of 180 mesh ground mica, and 5 parts of commercial cornstarch will have a consistency of a medium grease. The use of larger amounts of mica will tend to stiffen the lubricant to a greater degree, while the use of smaller amounts will give a softer lubricant. In general, amounts of mica ranging from about 5% to 50% of the final product will be found most suitable.

When starch is used in the glycerin-mica lubricant, only small amounts up to about 10% are necessary, and 5% or a little less will usually suffice. The startch has thickening action but its chief value here lies in its stabilizing action, whereby it maintains the mica in a colloid-like suspension almost indefinitely. Without starch, the glycerin-mica mixture requires periodic stirring to reestablish its homogeneity.

The temperature at which the starch is incorporated in the mixture will vary to some extent with the quality of the glycerin. With very pure glycerin the starch may be incorporated at a temperature of approximately 250° F., whereas with dynamite grade glycerin which apparently contains appreciable amounts of impurities, it is necessary to heat to a higher temperature such as 350° F. or even up to about 475° F. At temperatures of about 200° F. or below an entirely different product is obtained in either instance, which appears to be merely a suspension of the mica in the glycerin. As this product is heated to the above higher temperatures, however, a sudden change occurs, and the product becomes homogeneous, and assumes a smooth, viscous and grease-like consistency.

The mica may be incorporated at room temperature, either before or after the incorporation of the starch, although it is preferably added while the glycerin-starch mixture is hot or while it is cooling.

The preferred type of starch is raw starch, not partly hydrolyzed or so-called "soluble" starch, since lubricants containing the latter materials have been found to exhibit a degree of reduction in consistency upon heating which would be comparable with the viscosity change of a low grade western lubricating oil, whereas those prepared with raw starch have almost no tendency to thin out on heating. Also, the raw starches impart somewhat better water resistance to the product. Any starch, such as corn, potato, wheat, tapioca, and rice starches may be used; however, cornstarch has been found to be particularly effective.

For certain uses where a high degree of lubricity is not necessary, the mica may be omitted, and a simple starch-glycerin preparation used. In this case, larger amounts of starch may be used, up to about 20%, and in rare instances up to about 30%. For example, a composition prepared by incorporating 15% of commercial cornstarch in U. S. P. glycerin at about 250° F. had a smooth translucent appearance, and the consistency of a heavy grease. This consistency was maintained practically unchanged at temperatures from room temperature to nearly 300° F.

In place of the glycerin, other glycols such as ethylene glycol, diethylene glycol, triethylene glycol, propylene glycol, penta-glycerin, etc. may be used in many applications, although glycerin is preferred.

Fillers such as graphite, redwood bark dust, soapstone, etc., may also be incorporated in the above compositions.

Many other variations may be made within the scope of the following claims by those skilled in the art without departing from the spirit thereof.

I claim:

1. A lubricant comprising a glycol and starch prepared by heating a polyhydric alcohol selected from the group consisting of glycerin, ethylene glycol, diethylene glycol, triethylene glycol, propylene glycol, pentaglycerin substantially free from water with between about 5% and about 20% based on the polyhydric alcohol of raw starch to a temperature of at least about 250° F. the composition having a consistency varying from that of a medium grease to a heavy grease which consistency remains substantially unchanged at temperatures up to about 300° F.

2. A lubricant comprising a glycol, starch and mica prepared by heating less than about 5% to about 10% of raw starch with about 40% to more than about 90% of polyhydric alcohol selected from the group consisting of glycerin, ethylene glycol, diethylene glycol, triethylene glycol, propylene glycol, pentaglycerin to a temperature of at least about 250° F. and adding thereto between about 5% and about 50% of mica the composition having a consistency varying from that of a medium grease to a heavy grease which consistency remains substantially unchanged at temperatures up to about 300° F.

3. A lubricant prepared by heating a mixture of 75 parts of polyhydric alcohol selected from the group consisting of glycerin, ethylene glycol, diethylene glycol, triethylene glycol, propylene glycol, pentaglycerin, 20 parts of mica and 5 parts of non-hydrolyzed starch to a temperature of at least about 250° F. the composition having a consistency varying from that of a medium grease to a heavy grease which consistency remains substantially unchanged at temperatures up to about 300° F.

4. A lubricant as in claim 1 wherein said polyhydric alcohol is glycerin.

5. A lubricant as in claim 2 wherein said polyhydric alcohol is glycerin.

6. A lubricant as in claim 3 wherein said polyhydric alcohol is glycerin.

JAMES F. COOK.